(No Model.)
E. B. BAILEY.
LATHE CHUCK.
No. 316,931. Patented May 5, 1885.
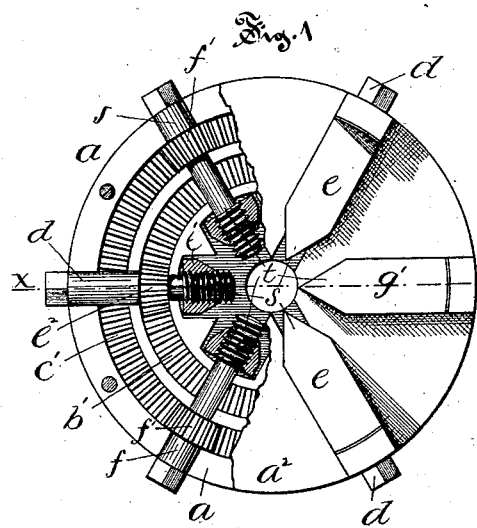
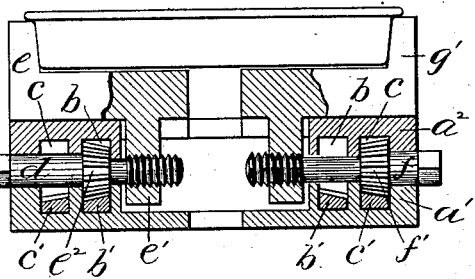
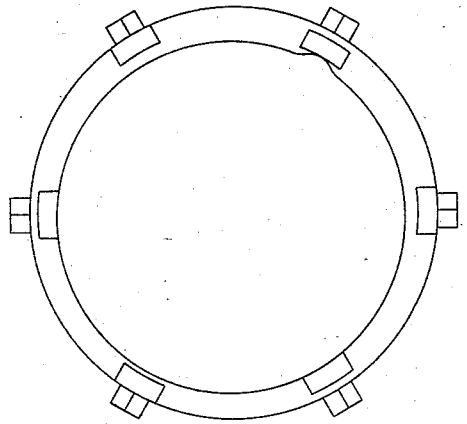
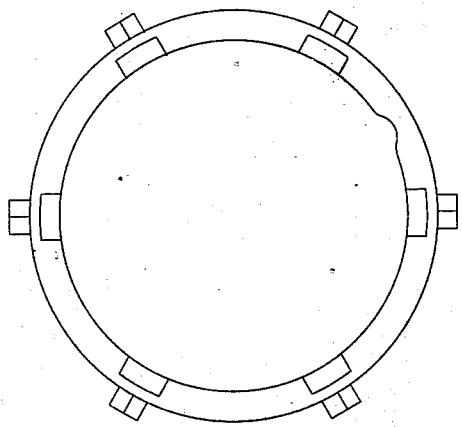
Witnesses
W. M. Bjorkman
E. F. Dimock
Inventor
Ezra B. Bailey,
By Simonds & Burdett,
Attys.

UNITED STATES PATENT OFFICE.

EZRA B. BAILEY, OF WINDSOR LOCKS, CONNECTICUT.

LATHE-CHUCK.

SPECIFICATION forming part of Letters Patent No. 316,931, dated May 5, 1885.

Application filed April 30, 1884. (No model.)

*To all whom it may concern:*

Be it known that I, EZRA B. BAILEY, of Windsor Locks, in the county of Hartford and State of Connecticut, have invented certain new and useful Improvements in Lathe-Chucks; and I do hereby declare that the following is a full, clear, and exact description thereof, whereby a person skilled in the art can make and use the same, reference being had to the accompanying drawings, and to the letters of reference marked thereon.

Like letters in the drawings indicate the same parts.

Figure 1 is a face view of my improved chuck with parts cut away to show interior. Fig. 2 is a view in cross-section of the chuck on plane denoted by line $xx$ of Fig. 1. Figs. 3 and 4 are diagram views illustrating the operation of the chuck.

My invention relates to the class of chucks known as "combination;" and it consists in the combination of two or more series of sets of universal jaws arranged with the jaws of the different sets in alternation, and in the combination of devices whereby the sets are independently operated.

In the accompanying drawings, the letter $a$ denotes a chuck-body made in two parts, $a'$ $a^2$, in the common outline and of ordinary material—as iron cast to shape—the body part $a'$ having the concentric annular sockets $b$ $c$, in which the annular racks $b'$ $c'$ are seated, and are movable in the manner common in the single rack chucks.

In bearings formed in each body part of the chuck and on each side of the plane of separation of the parts the rotary shafts $d$ are seated, and they have threaded ends that work in the threaded socket in the projections $e'$ on the jaws $e$. They also bear each a bevel-gear, $e^2$, in mesh with the annular rack $b'$ in such manner that when any one of the shafts $d$ is turned—as by a wrench applied to the squared projecting end—all of the shafts $d$ are rotated to an equal degree, and move the jaws $e$ an equal distance, forming a universal series, $s$. The similar shafts, $f$, bear bevel-gears $f'$ in mesh with the annular gear $c'$, and the rotation of a shaft, $f$, moves all the jaws $g'$ of the universal series $t$. The jaws of the two series are arranged in alternation, and the device is especially adapted to centering a car-wheel, pulley, or like device that is liable to have certain irregularities of the peripheral surface—that is, departure from a true circle.

The operation is as follows: The article—as a car-wheel—to be bored is placed against the face of the chuck, or within the jaws, and those of one series, $s$, are moved up by turning any one of the shafts $d$, so as to tightly grasp the periphery (tread) of the wheel. The jaws of the other series are then simultaneously closed upon the tread of the wheel and move it into a more central position, governed, however, by the irregularities of the periphery.

In the form shown two sets of three jaws in each set are used, and the wheel is first centered by any two of the three jaws of a set in case there are any irregularities in the surface of the tread, and the jaws of the other set or series move the wheel to a position that centers it from six points at equal distances apart on the periphery, and so gets the average of the errors of outline. The wheel is then bored, and after being fixed on the axle is ground on the tread to a true circle with the axis of the circle as a center, and by being centered automatically—as by means of my improvement—a saving in this operation is gained.

It is evident that, in addition to the features of the form of chuck herein shown, one of the series of jaws may be both independent and universal, so long as the universal form of the set is present in each of the series. It is also desirable to the proper practice of my invention that there should be not less than three jaws in each set, these jaws being arranged at points equidistant from each other around the chuck-body, as this is the least number by means of which the center of a circular body may be determined.

I claim as my improvement—

1. In a lathe-chuck, in combination with the body parts having sockets for the operating parts, three or more jaws forming a set that are operated by means of an annular gear and the pinion-bearing shaft, and another series of three or more jaws forming a set distinct from the first and operated by means of an annular gear common to the latter set and by a pinion-bearing shaft, all substantially as described.

2. In combination, chuck-body $a'$, body $a^2$, concentric annular gears $b'$ and $c'$, and the jaws $e$ and $g'$, arranged in the separate series $s$ and $t$ of universal jaws, all substantially as described.

EZRA B. BAILEY.

Witnesses:
 E. F. DIMOCK,
 W. H. MARSH.